(No Model.) 4 Sheets—Sheet 1.
C. B. BOSWORTH.
RECORDING PRESSURE GAGE.

No. 535,157. Patented Mar. 5, 1895.

WITNESSES
F. L. Ouraud
J. Gregory

INVENTOR
C. B. Bosworth
per W. H. Singleton
Attorney (No Model.) 4 Sheets—Sheet 2.
C. B. BOSWORTH.
RECORDING PRESSURE GAGE.

No. 535,157. Patented Mar. 5, 1895.

WITNESSES
F. L. Ourand
J. Gregory

INVENTOR
C. B. Bosworth
per W. H. Singleton.
Attorney (No Model.) 4 Sheets—Sheet 3.

C. B. BOSWORTH.
RECORDING PRESSURE GAGE.

No. 535,157. Patented Mar. 5, 1895.

WITNESSES
F. L. Ourand
J. Gregory

INVENTOR
C. B. Bosworth
per W. H. Singleton
Attorney (No Model.) 4 Sheets—Sheet 4.

C. B. BOSWORTH.
RECORDING PRESSURE GAGE.

No. 535,157. Patented Mar. 5, 1895.

UNITED STATES PATENT OFFICE.

CHARLES BARTLETT BOSWORTH, OF EVERETT, ASSIGNOR TO THE CROSBY STEAM GAGE AND VALVE COMPANY, OF BOSTON, MASSACHUSETTS.

RECORDING PRESSURE-GAGE.

SPECIFICATION forming part of Letters Patent No. 535,157, dated March 5, 1895.

Application filed December 18, 1894. Serial No. 532,199. (No model.)

*To all whom it may concern:*

Be it known that I, CHARLES BARTLETT BOSWORTH, a citizen of the United States, residing at Everett, in the county of Middlesex and State of Massachusetts, have invented certain new and useful Improvements in Recording-Gages; and I do hereby declare the following to be a full, clear, and exact description of the invention, such as will enable others skilled in the art to which it appertains to make and use the same.

This invention relates to recording steam gages in which the excess of steam pressure, over that prescribed, is automatically recorded; all of which will be hereinafter more particularly described and pointed out.

Figure 1:
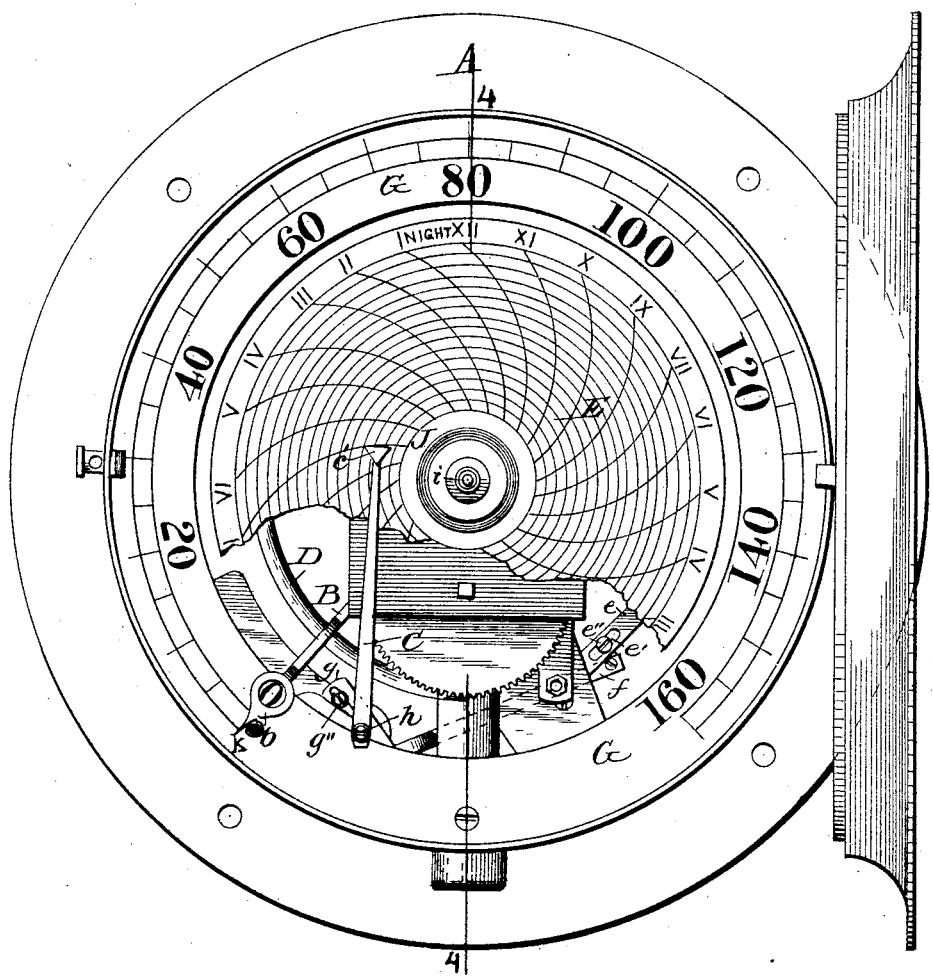
Figure 2:
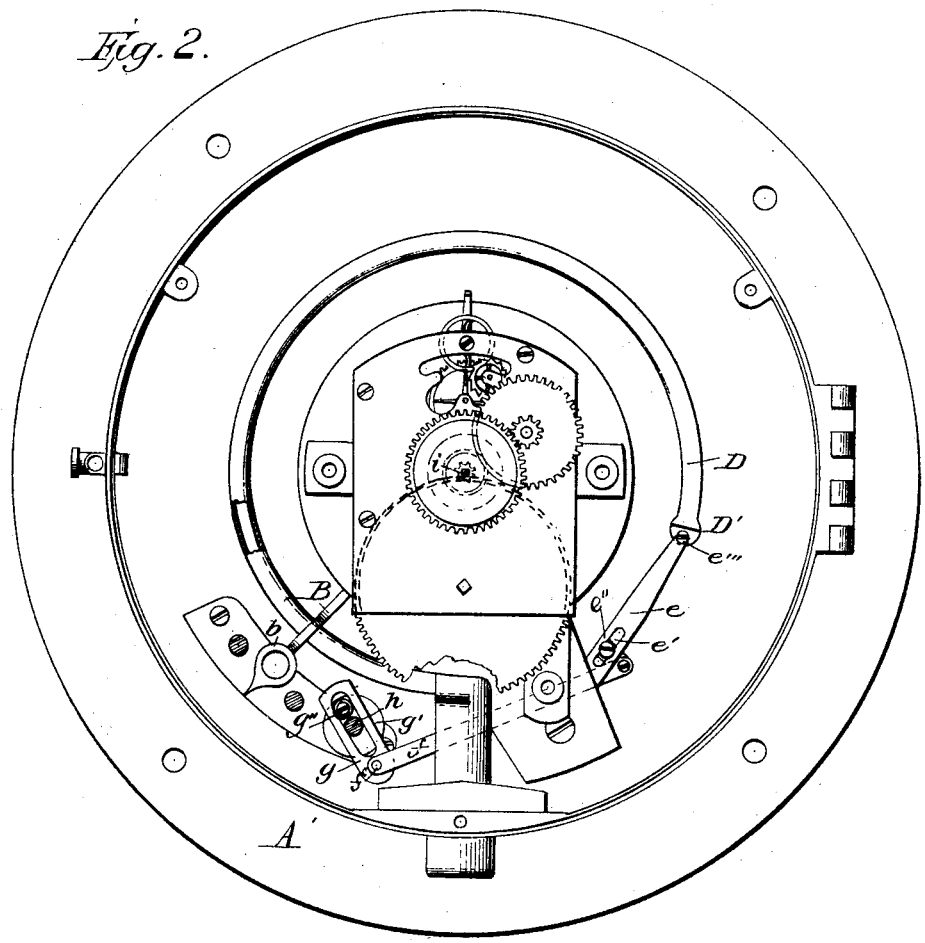
Figure 5:
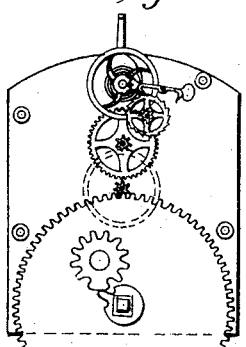
Figure 3:
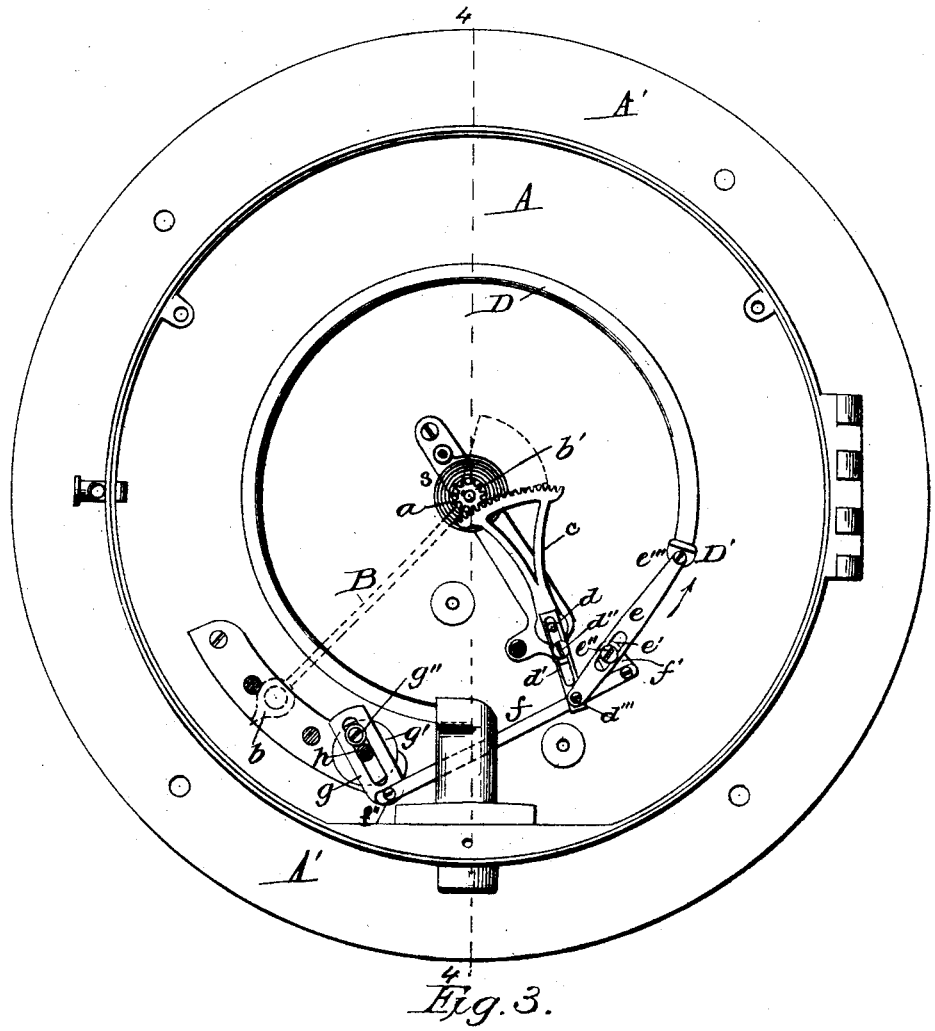
Figure 4:
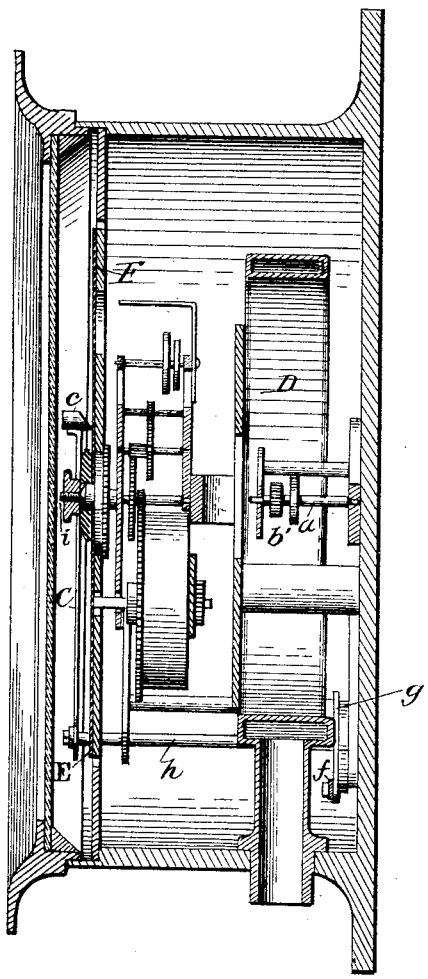

In the accompanying drawings contained in four sheets and forming part of this specification: Figure 1, Sheet 1, is a front view having a part of the dial plate removed to show a portion of the interior mechanism. Figs. 2 and 5, Sheet 2, are interior views of the mechanism and clock-work. Fig. 3, Sheet 3, is an interior view of the mechanism of the gage, the clock-work being removed. Fig. 4, Sheet 4, is a transverse section on line 4—4 of Figs. 1 and 3.

A is the cylindrical case, in which are the mechanism to be operated by the steam through a Bourdon tube and the clock movement.

B is the pressure indicating index, which is secured to the central shaft, $a$, and is arranged so that its point, $b$, will move over the graduated arc, numbered from 0 to 160 in this case. The shaft, $a$, is placed in proper bearings supported in the cylindrical case A and on it, near the end, is a pinion, $b'$, which engages with a toothed sector, $c$, pivoted at $d$ (Fig. 3) mounted in bearings in which it can rotate, and at its outer end has a slotted bar, $d'$, attached by a set-screw, $d''$, which is pivoted to a connecting rod, $e$, by a pivot screw, $d'''$. Rod, $e$, is pivoted through a slot, $e'$, to the short arm, $f'$, of a second connecting rod, $f$, by a screw, $e''$. The rod, $e$, is also pivoted at its opposite end, by a screw, $e'''$, to the free end of a Bourdon tube, D. The opposite end of rod, $f$, is pivoted by a screw, $f''$, to a short slotted lever, $g$. Through the slot in lever, $g$, projects a shaft, $h$, which extends from the bottom of the cylindrical case A to a short distance beyond the dial plate, as seen in Fig. 4. On the end of shaft, $h$, is secured the pencil carrier arm, C, Figs. 1 and 4.

Beneath the lever, $g$, there is a wheel, $g'$, to which the lever is secured, through the slot, by a set-screw, $g''$, the purpose of which is to adjust lever, $g$, for a long or short fulcrum for the suitable motion of the shaft, $h$, as may be required. There is a coiled spring, $s$, around shaft, $a$, by which the indicating index is returned to its place at 0 when the steam is shut off—and there is a stop pin ($k$) to prevent it from going beyond that point.

E is a dial, made of paper or other suitable material, which is placed upon the covering plate, F, which is centered upon the boss, J, on the shaft, $i$, of the clock-work and moves around with it, all of which is shown in section Fig. 4, and is so well known as not to require a description. As the clock moves, this dial, E, is rotated by the shaft $i$ and it is divided into twenty-four parts by curved radial lines from the center and is numbered from 1 to 12 for day and 1 to 12 for night. Concentric lines are shown from the center boss, J, to the circumference, and they are numbered from 0 to 160—to correspond with the numbers 0 to 160 on the circumferential arc G' shown in Fig. 1.

The dial, E, being rotated by the movement of the clock, and a pencil or other marker being placed in the socket, $c'$, of the arm, C, and put in contact with the dial paper, a continued trace of the pencil will be left on the paper as it rotates, and any motion given to the pencil arm radially will be indicated on the dial paper between the hour marks thereon. The Bourdon tube, by the pressure of the steam, will expand, and the end, D', will instantly operate the bar, $e$, in the direction of the arrow, and will pull in the same direction the outer end of the sector, $c$, which immediately causes the pinion, $b'$, to rotate and carry around with it the index, B. At the same time bar, $e$, operates upon the short arm, $f'$, of the lever, $f$, by means of the set-screw, $e''$, which is for the purpose of adjusting the arm, $f'$, within the slot, $e'$, as may be required, in connection with the adjustment of the other end of bar, $f$, to or from the center of the shaft, $h$, within the slot of the lever, $g$, by which adjustment the motion of the shaft, $h$, is regulated, and consequently the movements of the pencil carrier arm are also regulated correspondingly.

Having described my invention, what I claim is—

The combination of a Bourdon tube with a series of mechanical devices, consisting of the bar, $e$, having the slot, $e'$, and pivoted to the arm, $f'$, of the bar, $f$, by an adjustable screw, $e''$; the bar, $f$, pivoted to the slotted lever, $g$, which is adjustable on the shaft, $h$, having on its end a pencil carrier arm, C, the dial sheet, E, graduated as described; and attached to the shaft, $i$, of the clock-work; the bar, $e$, also connected to the adjustable arm of the sector, $c$; the pinion, $b'$, on the shaft, $a$, having attached to its end the index arm, B, all inclosed in the cylindrical case, A; substantially as and for the purpose described.

In testimony whereof I affix my signature in presence of two witnesses.

CHARLES BARTLETT BOSWORTH.

Witnesses:
JOSHUA H. MILLETT,
OMAR H. GIBBS.